United States Patent
Barbat et al.

(10) Patent No.: US 9,227,585 B1
(45) Date of Patent: Jan. 5, 2016

(54) MOVABLE VEHICLE BUMPER

(71) Applicant: Ford Global Technologies, LLC, Dearborn, MI (US)

(72) Inventors: Saeed David Barbat, Novi, MI (US); Mohamed Ridha Baccouche, Ann Arbor, MI (US); Rahul Arora, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/547,391

(22) Filed: Nov. 19, 2014

(51) Int. Cl.
*B60R 19/00* (2006.01)
*B60R 19/38* (2006.01)
*B60R 19/48* (2006.01)
*B60R 21/34* (2011.01)

(52) U.S. Cl.
CPC .............. *B60R 19/38* (2013.01); *B60R 19/483* (2013.01); *B60R 21/34* (2013.01)

(58) Field of Classification Search
CPC ........ B60R 19/38; B60R 19/483; B60R 21/34

USPC .................................................. 293/118, 155
See application file for complete search history.

(56) References Cited

U.S. PATENT DOCUMENTS 5,080,412 A * 1/1992 Stewart et al. ................ 293/155
6,315,338 B1 * 11/2001 Schneider et al. ............ 293/115

FOREIGN PATENT DOCUMENTS

| FR | 2857300 | 1/2014 |
| JP | 04046814 | 2/1992 |
| JP | 2007320496 | 12/2007 |
| JP | 2007320531 | 12/2007 |
| JP | 2009154678 | 7/2009 |

* cited by examiner

*Primary Examiner* — Joseph D Pape
(74) *Attorney, Agent, or Firm* — Frank A. MacKenzie; Bejin Bieneman PLC

(57) ABSTRACT

A vehicle bumper system, comprises a first bracket fixedly mounted to a bumper. A second bracket is fixedly mounted to a vehicle frame horn, the second bracket including at least one vertical slot. At least one bolt is inserted through an opening in the first bracket and the at least one slot.

18 Claims, 8 Drawing Sheets

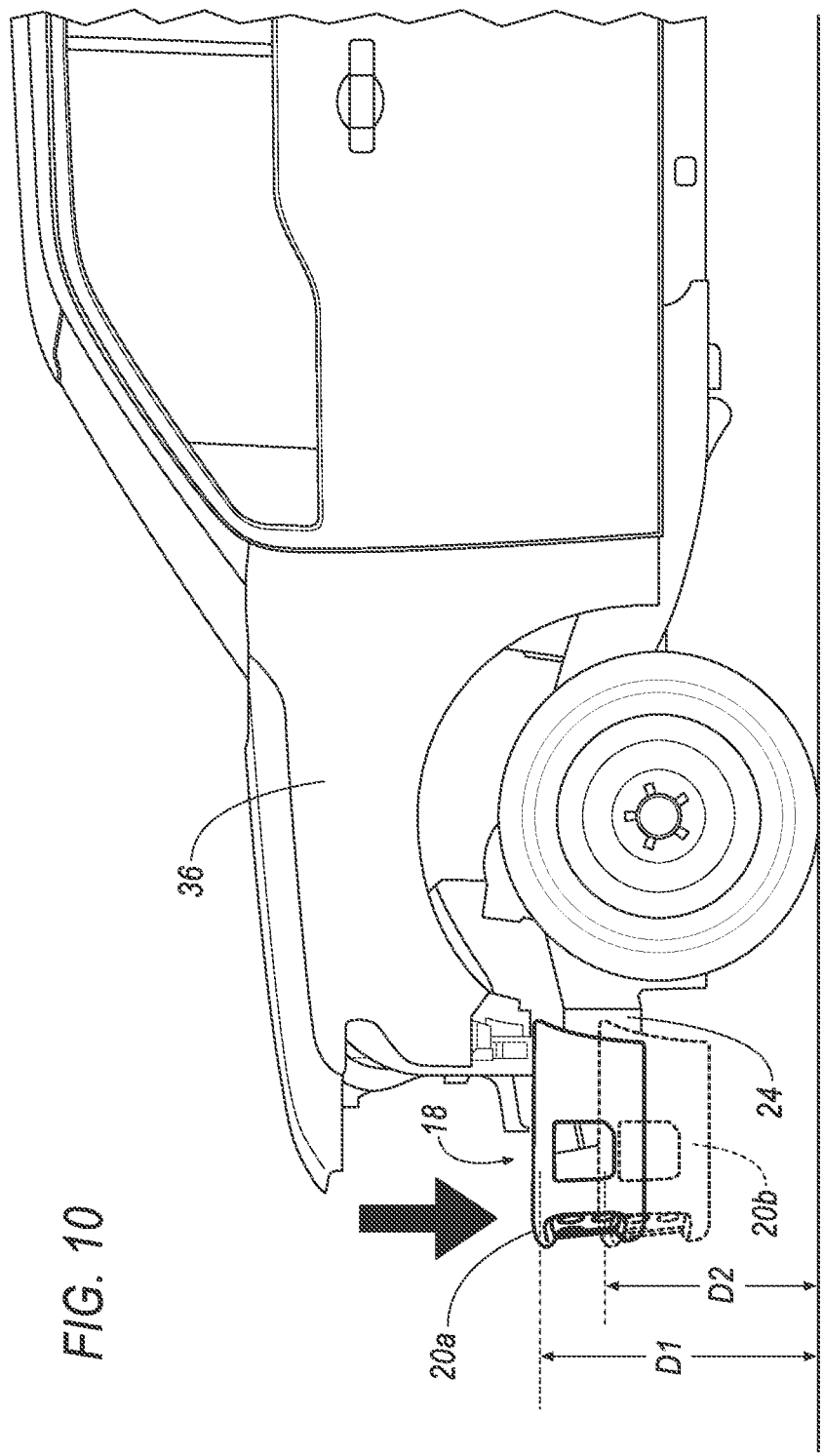

MOVABLE VEHICLE BUMPER

BACKGROUND

Vehicles with relatively high bumpers, such as light trucks, sport utility vehicles, etc., tend to cause more and more serious injuries to pedestrians than other vehicles that have lower bumpers, e.g., sedans. Such injuries, and their frequency and severity, are often result primarily from a greater height of a vehicle bumper. For example, a pedestrian struck by a vehicle with a high bumper may be more likely to stiffer a broken leg, to be dragged under a vehicle on impact, etc.

DRAWINGS

FIG. 10 is a side perspective view of a vehicle including the exemplary bumper assembly of FIG. 2, showing a bumper in an initial and in a final position.

DESCRIPTION

Figure 1:
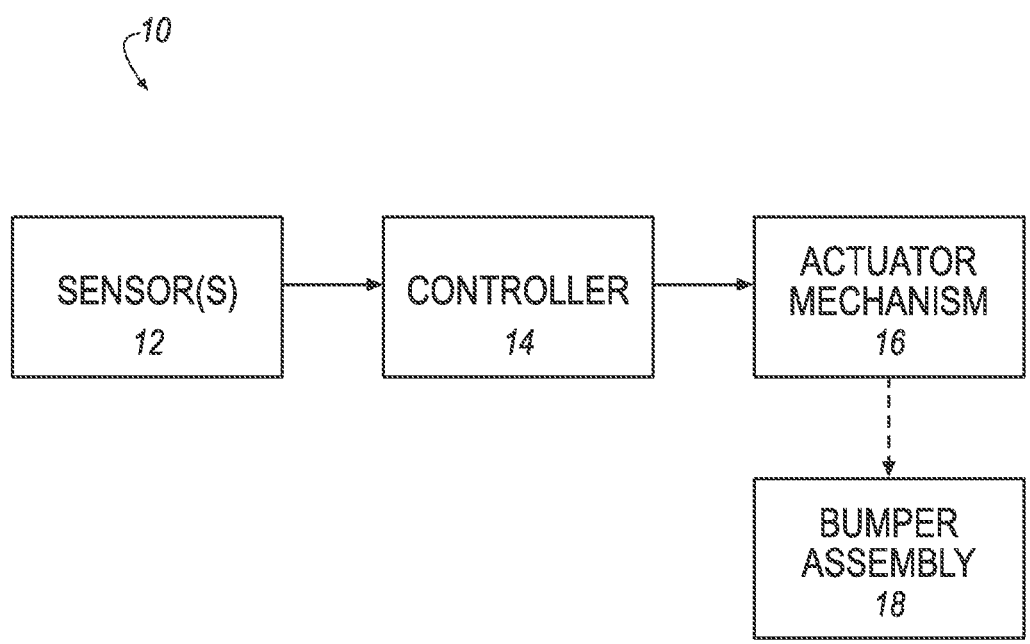
FIG. 1 is a block diagram of a movable bumper system.
Figure 2:
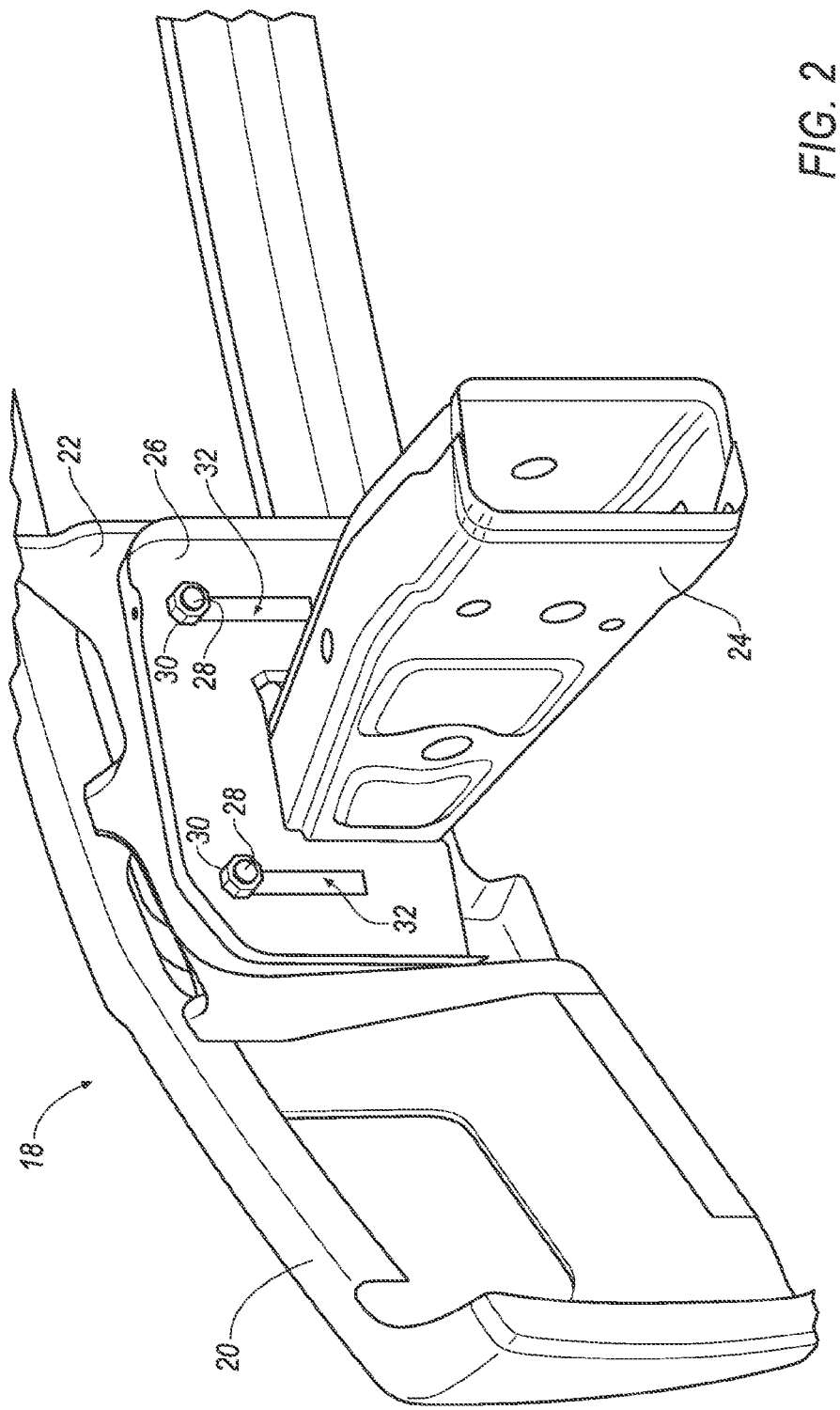
FIG. 2 is a perspective view of a portion of an exemplary bumper assembly.

FIG. 1 is a block diagram of a movable bumper system 10. Sensors 12, e.g., one or more cameras and/or radar sensors, provide input to a controller 14, e.g., an electronic control unit (ECU) as is known for use in a vehicle, to indicate a likely or imminent pedestrian collision. Upon determining that a pedestrian collision is likely and/or imminent, the controller 14 may provide an instruction to an actuator mechanism 16 that is arranged to, upon actuation, caused some or all of a bumper assembly 18 to drop in height. The controller 14 generally includes a processor and a memory, the memory storing instructions executable by the processor for carrying out actions including as described herein. Further, the controller 14, sensors 12, actuator mechanism 16, and/or other components and devices in a vehicle may communicate via known mechanisms, e.g., a controller area network (CAN) or other communications bus in a vehicle such as is known. Accordingly, the controller 14 may determine a likely or imminent pedestrian collision, and may, via the actuator mechanism 16, cause some or all of the bumper assembly 18 to drop in height, thereby reducing the likelihood and/or severity of injuries to a pedestrian upon a pedestrian collision with a vehicle.

Turning now to FIGS. 2-9, a bumper assembly 18 includes a bumper 20 having a bumper bracket 22 fixedly mounted thereon, i.e., mechanically attached thereto in a manner substantially to prevent movement of the bumper 20 and bracket 22 with respect to one another, e.g., welded and/or bolted, etc. A vehicle frame horn 24, such as may be included in a vehicle frame, is fixedly mounted, i.e., mechanically attached, e.g., welded and/or bolted, etc., to a horn bracket 26. Although not shown in the figures, it is to be understood that the bumper assembly 18 could include two sets of brackets 22, 26, i.e., one each attached to each of a pair of frame horns 24 that may be provided at a front of a vehicle.

The bracket 22 is attached or mounted to the bumper 20 in a manner that the bumper 20 and bracket 22 do not move vertically with respect to one another. Likewise, the bracket 26 is attached or mounted to the frame horn 24 in a manner such that the bracket 26 and frame horn 24 do not move vertically with respect to one another. The brackets 22, 26 are mated together and, in an initial position described further below, securely held in place so as to prevent vertical movement of the brackets 22, 26 with respect to one another, by bolts 28 secured by nuts 30, the bolts 28 being inserted through holes or other openings in the bracket 22 (not visible in the figures) and respective slots 32 in the horn bracket 26. The bumper 20, frame horn 24, and brackets 22, 26, are generally formed of metal in a known manner. Likewise, the bolts 28 and nuts 30 are generally metal, e.g., parts such as are known.

In operation of the movable bumper system 10, upon detecting a likely or imminent pedestrian collision, the controller 14 sends a signal to the actuator mechanism 16 to actuate movement of the bumper assembly 18, i.e., to cause the bumper 20 to drop with respect to the bracket 26 and frame horn 24. That is, the actuator mechanism 16 prevents the bolts 28 and nuts 30, e.g., in a manner described further below, from continuing to secure the brackets 22, 26, such that the bracket 22 and bumper 20 are held in the initial position against the frame horn bracket 26. When the secure hold of the brackets 22, 26 is broken, the bumper 20 and bracket 22 drop from an initial position to a final position, the drop of the bumper 20 and bracket 22 being guided by the slots 32, i.e., movement of the bumper 20 and bracket 22 are restrained by the bolts 28 which remain inserted through the slots 32.

Figure 6:
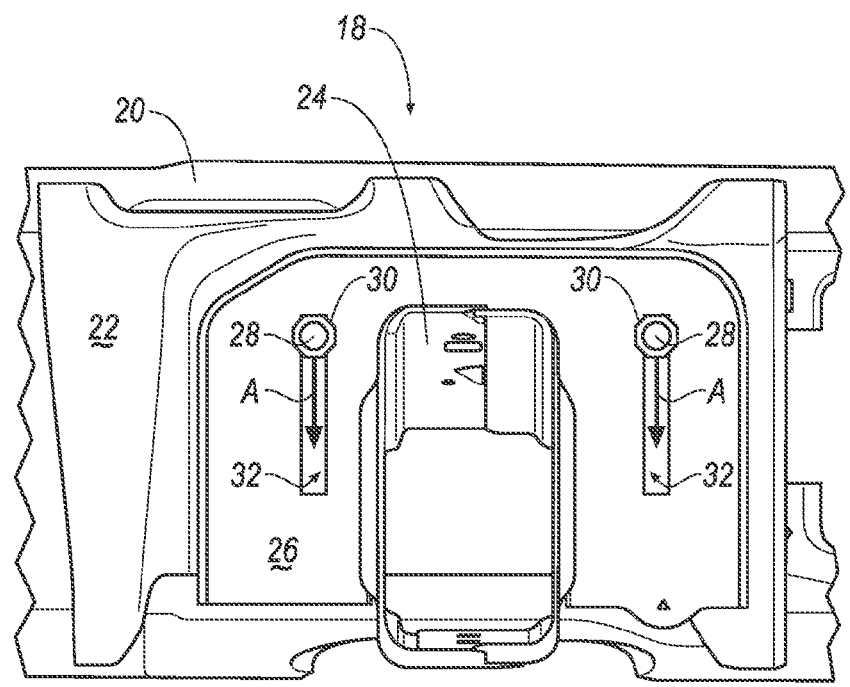
FIG. 6 is a rear view of a portion of the exemplary bumper assembly of FIG. 2 where a bumper is in an initial position.
Figure 7:
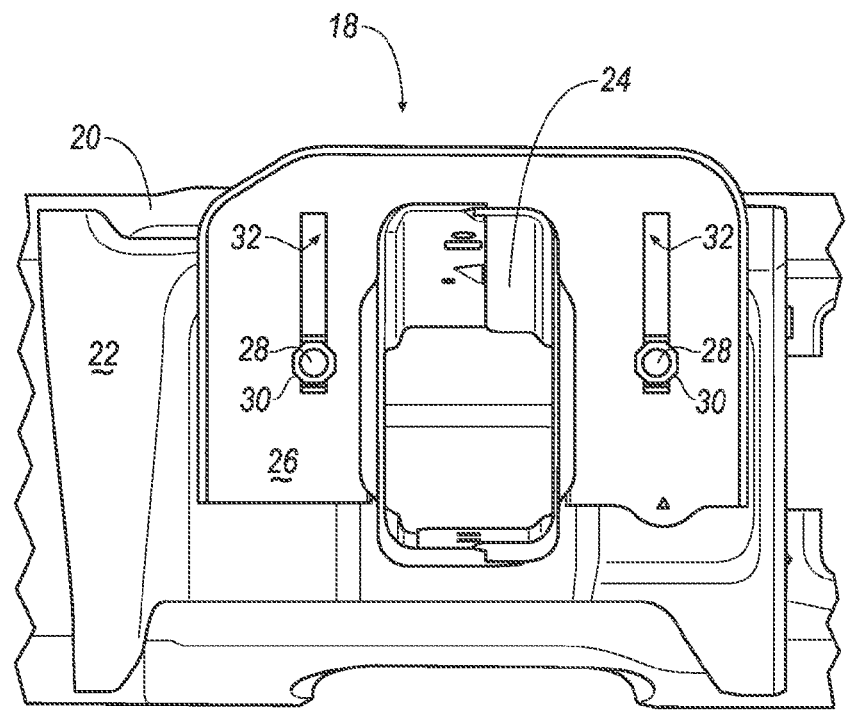
FIG. 7 is a rear view of a portion of the exemplary bumper assembly of FIG. 2 where a bumper is in a final position.
Figure 8:
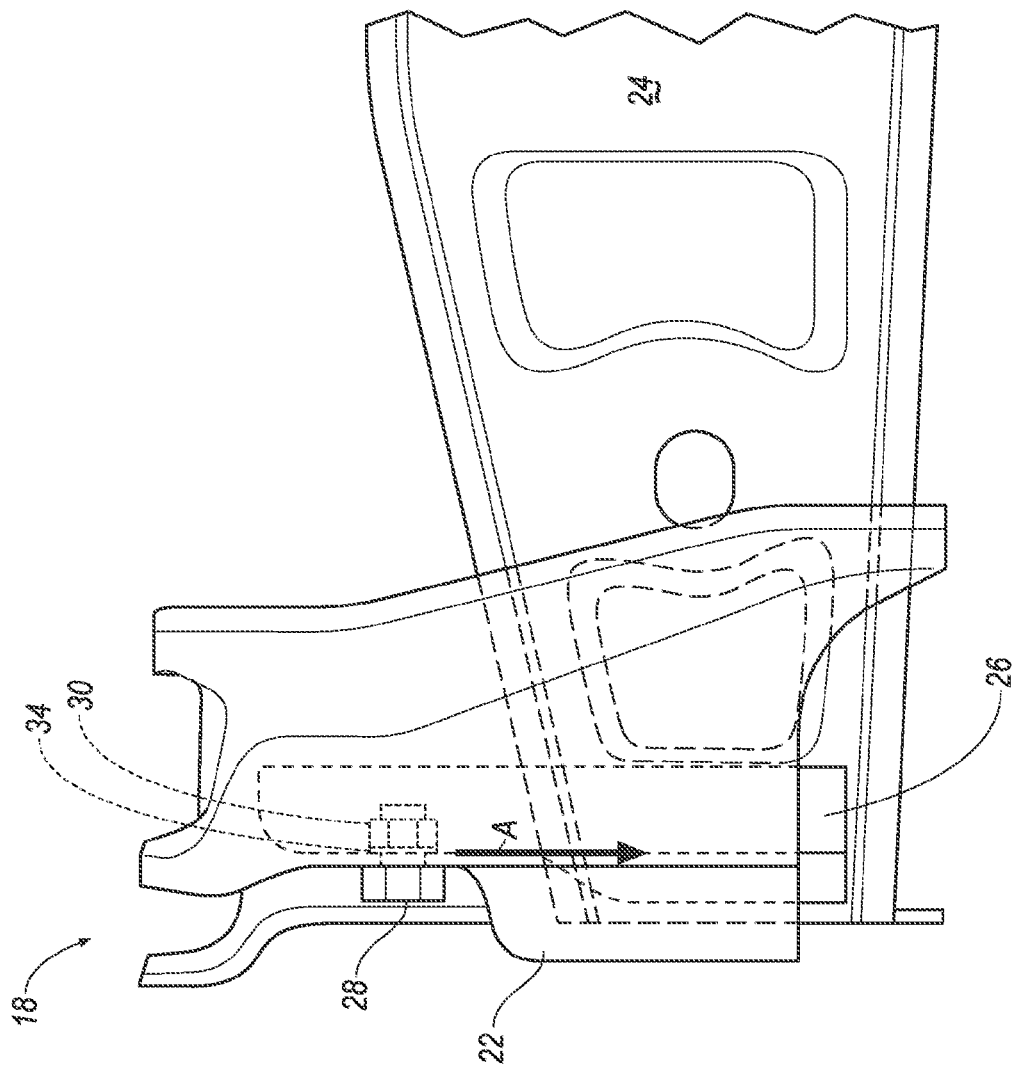
FIG. 8 is a side view of a portion of the exemplary vehicle bumper bracket and a vehicle frame horn positioned with respect to one another for a bumper initial position.
Figure 9:
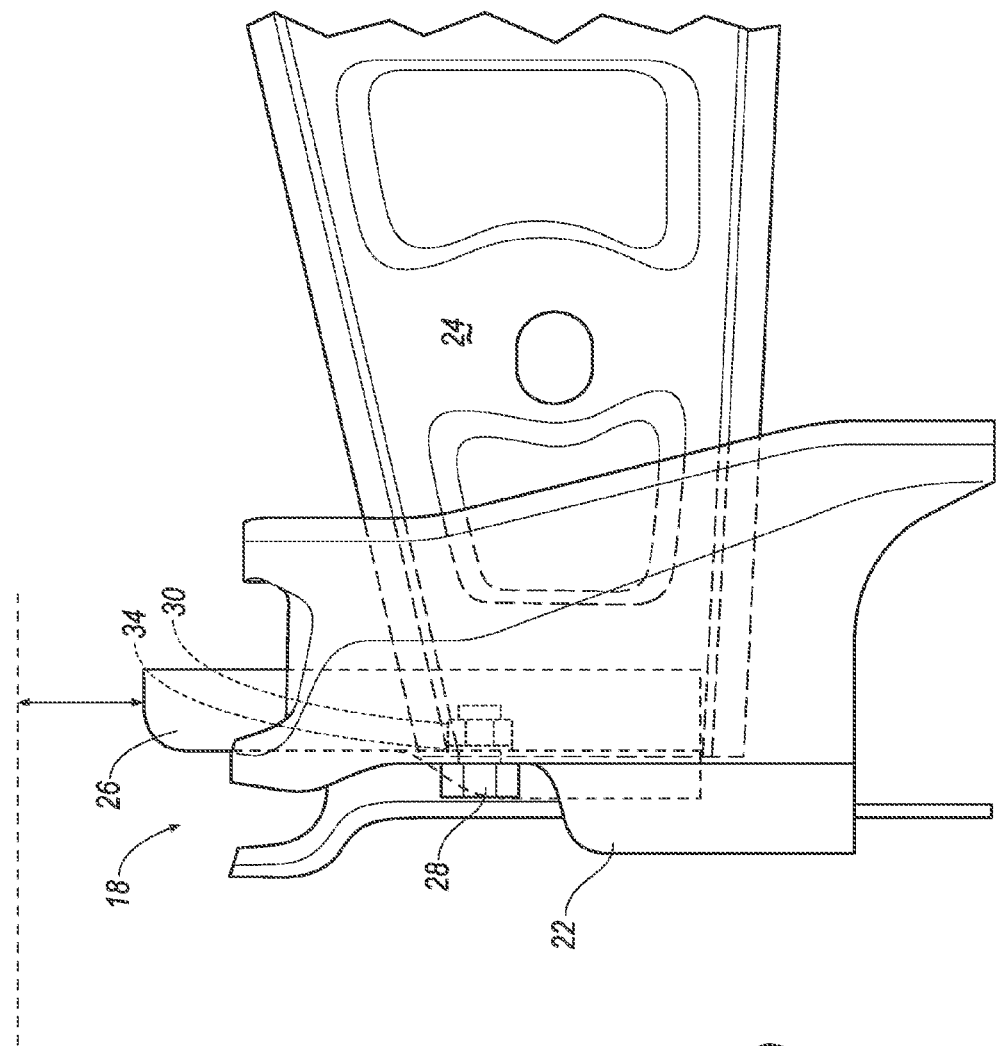
FIG. 9 is a side view of a portion of the exemplary vehicle bumper bracket and a vehicle frame horn positioned with respect to one another for a bumper final position.

FIGS. 6 and 8 provide views of the bracket 22 in the initial position. Further, FIGS. 7 and 9 provide views of the bracket 22 in the deployed or final position. In general, the initial position includes the bumper 20 at a height, i.e., distance from the ground, a roadway, etc., that is greater than a height of the bumper 20 in the final position. That is, the initial position is provided for normal travel and operation of a vehicle, and the final position is provided for use in the event of a pedestrian collision. Examples of the initial and final position may be seen in FIG. 10. With reference to FIG. 10, the bumper assembly may be mounted on a vehicle 36. To illustrate the initial and final position, a bumper 20a is shown in the initial position at a first height $D_1$, and a bumper 20b is shown at a second height $D_2$, the second height being less than the first height.

Figure 3:
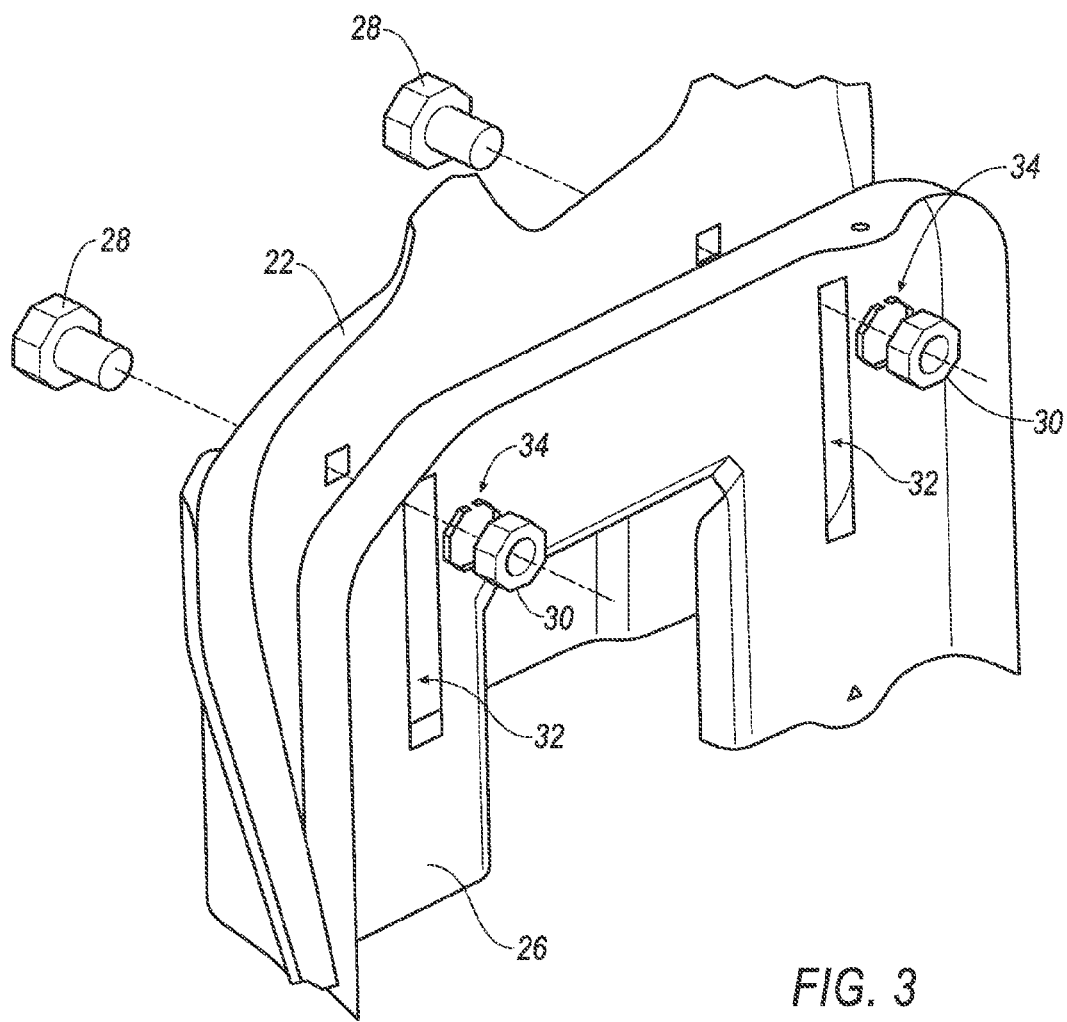
FIG. 3 is an exploded view of a vehicle bumper bracket and a vehicle frame horn bracket according to the exemplary bumper assembly of FIG. 2.
Figure 4:
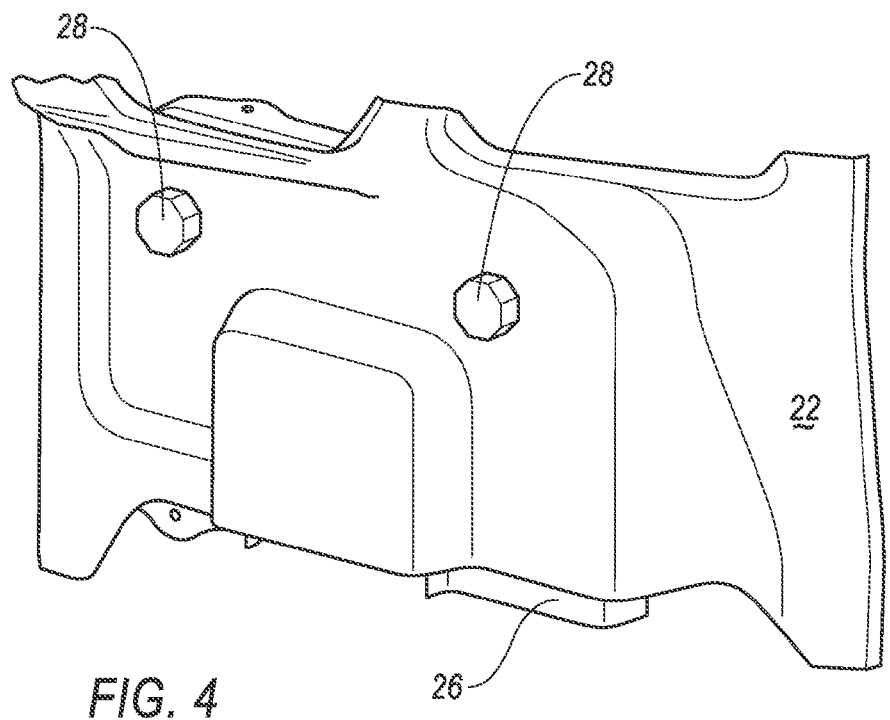
FIG. 4 is a front perspective view of a vehicle bumper bracket and a vehicle frame horn bracket according to the exemplary bumper assembly of FIG. 2.
Figure 5:
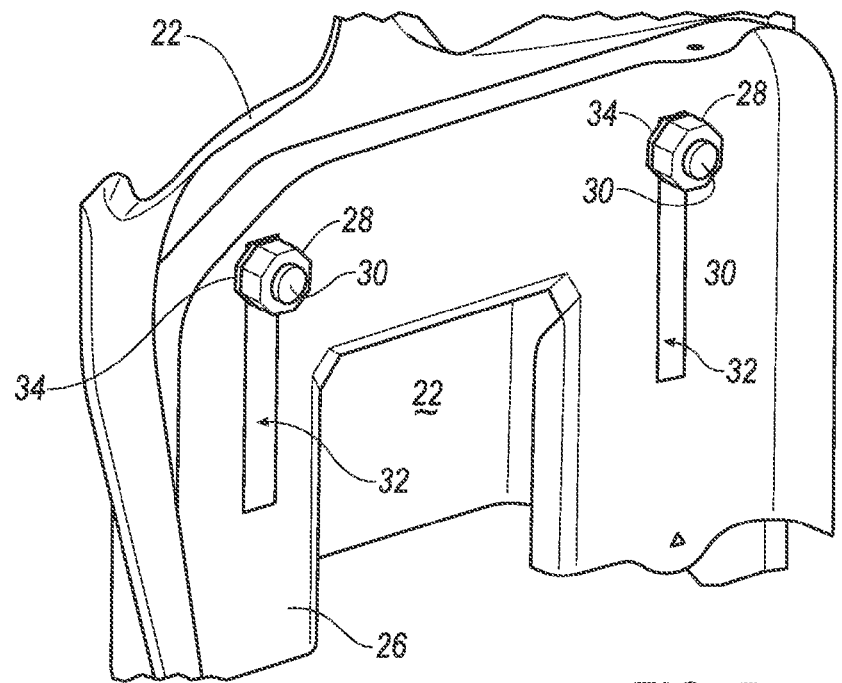
FIG. 5 is a rear perspective view of a vehicle bumper bracket and a vehicle frame horn bracket according to the exemplary bumper assembly of FIG. 2.

As is perhaps best seen in FIG. 3, but also illustrated in FIGS. 5 and 8, respective spacers 34 are interposed between the bracket 26 and the nut 30. For example, a spacer 34 may comprise two semi-circular, octagonal, hexagonal, etc., pieces, e.g., washer halves or the like, that surround a stem of the bolt 28, the spacer 34 pieces being held in place by friction when the nut 30 is tightened on a threaded stem of the bolt 28. The spacer 34 may be made of metal, plastic, etc. Accordingly, the actuator mechanism 16 is arranged to cause the spacers 34 to be displaced from a location between respective nuts 30 and a side of the bracket 26. Once such displacement occurs, a frictional force by which the brackets 22, 26 are held in place with respect to one another is dissipated, and the bracket 22 drops from the initial position to the final position, carrying the bumper 20 with it. For example, the actuator mechanism 16 can be connected to the spacer 34 via a wire or the like which can be used to displace the spacer 34 outwards, causing the bumper 20 to drop.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A vehicle bumper system, comprising:
a first bracket fixedly mounted to a bumper;
a second bracket fixedly mounted to a vehicle frame horn, the second bracket including at least one vertical slot;
at least one bolt that is inserted through an opening in the first bracket and the at least one vertical slot; and
at least one spacer that includes at least two pieces, each of the pieces being frictionally held between a side of the second bracket and a nut that is secured to the bolt.

2. The system of claim 1, wherein, when the bolt is inserted through the opening and the at least one slot, and the at least one spacer is displaced, the bumper is movable in a vertical direction with respect to the frame horn.

3. The system of claim 1, wherein the at least one bolt is secured by the at least one nut being threaded thereon.

4. The system of claim 1, wherein the at least two spacer pieces are displaceable from between the at least one nut and the side of the second bracket.

5. The system of claim 1, further comprising a controller that is programmed to receive an indication from at least one sensor of a possible pedestrian collision, and to then provide a signal to trigger an actuator to cause dislocation of the at least one spacer.

6. The system of claim 1, wherein the system is installed in a vehicle.

7. The system of claim 4, wherein, upon displacement of the at least two spacer pieces, the bumper drops from a first height to a second height.

8. The system of claim 1, wherein the at least one slot is a plurality of slots.

9. The system of claim 1, further comprising:
a third bracket fixedly mounted to the bumper;
a fourth bracket fixedly mounted to a second vehicle frame horn, the fourth bracket including at least one second vertical slot; and
at least one second bolt that is inserted through an opening in the third bracket and at least one second slot.

10. A system, comprising:
vehicle bumper assembly that includes:
a first bracket fixedly mounted to a bumper;
a second bracket fixedly mounted to a vehicle frame horn, the second bracket including at least one vertical slot; and
at least one bolt that is inserted through an opening in the first bracket and the at least one slot such that the bumper is movable in a vertical direction with respect to the frame horn; the system further comprising
at least one sensor;
a controller communicatively coupled to the sensor; wherein the controller is programmed to receive an indication from the at least one sensor of a pedestrian collision, and to then instruct an actuator to cause the bumper to drop from a first height to a second height.

11. The system of claim 10, further comprising at least one nut, wherein the at least one bolt is secured by the at least one nut being threaded thereon.

12. The system of claim 11, further comprising at least one spacer that is disposed between the at least one nut and a side of the second bracket.

13. The system of claim 12, further comprising an actuator mechanism that is arranged to cause dislocation of the at least one spacer from between the at least one nut and the side of the second bracket.

14. The system of claim 10, wherein the system is installed in a vehicle.

15. A method for causing vertical dislocation of a first bracket with respect to a second bracket, the method comprising:
dislocating a spacer provided between a nut and a side of the second bracket, wherein the spacer includes at least two pieces;
wherein the first bracket is fixedly mounted to a vehicle bumper and the second bracket is fixedly mounted to a vehicle frame horn; and
further wherein the nut is attached to a bolt that is inserted through an opening of the first bracket and also is inserted through a slot in the second bracket.

16. The method of claim 15, further comprising receiving a signal in a controller from at least one sensor of a possible pedestrian collision.

17. The method of claim 15, wherein dislocation of the spacer results in the bumper dropping from a first height to a second height.

18. The method of claim 15, wherein a third bracket is fixedly mounted to the vehicle bumper and a fourth bracket is fixedly mounted to a vehicle frame horn; a second spacer having at least two pieces being provided between a second nut and a side of the third bracket, the second nut being attached to a second bolt that is inserted through an opening in the third bracket and at least one second slot in the fourth bracket.

* * * * *